Figure 8:
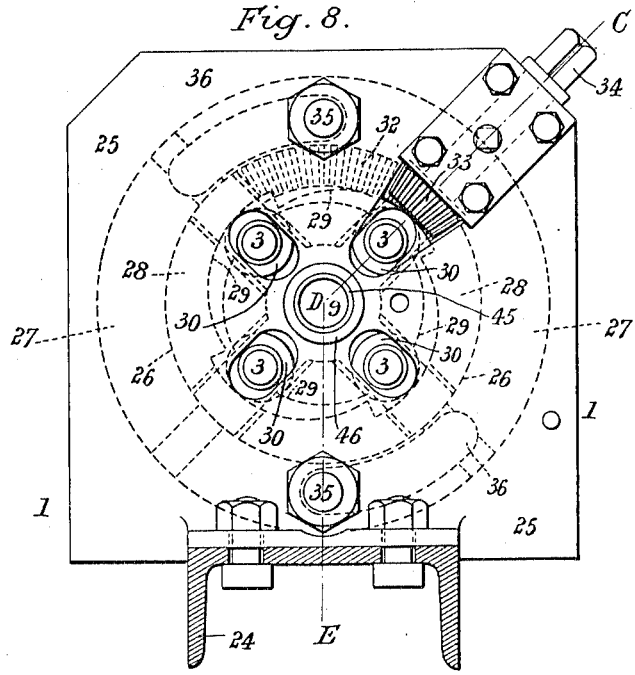

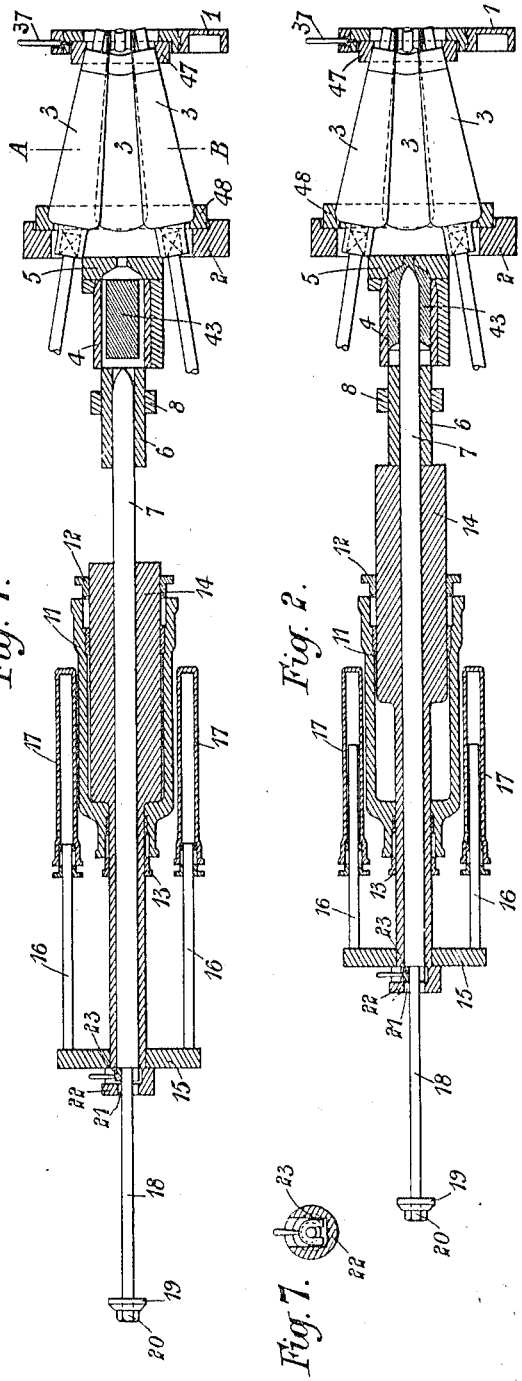

J. G. & G. R. INSHAW.
APPARATUS FOR THE MANUFACTURE OF HOLLOW METAL BLOOMS OR BILLETS AND TUBES THEREFROM.
APPLICATION FILED NOV. 14, 1913.
1,118,864.
Patented Nov. 24, 1914.
4 SHEETS—SHEET 2.
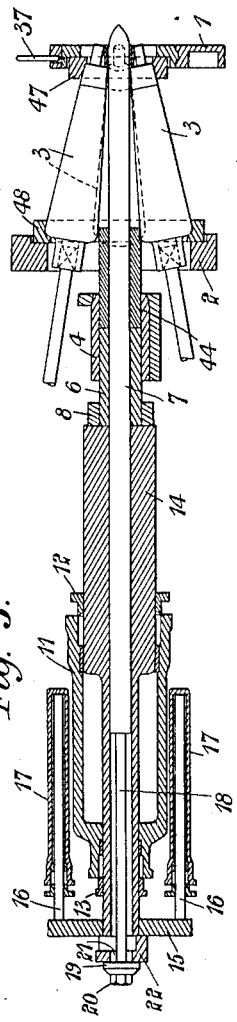
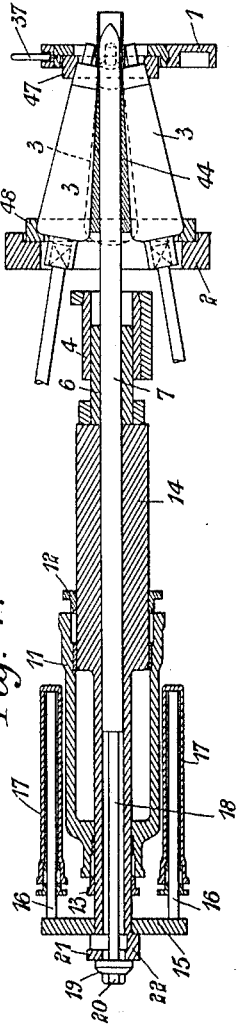
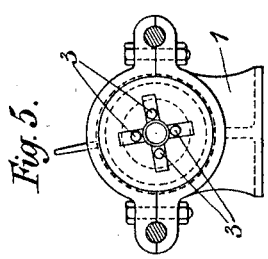
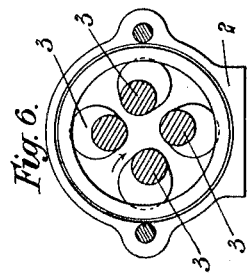
WITNESSES
INVENTORS
John George Inshaw
George Richard Inshaw
BY
ATTORNEYS J. G. & G. R. INSHAW.
APPARATUS FOR THE MANUFACTURE OF HOLLOW METAL BLOOMS OR BILLETS AND TUBES THEREFROM.
APPLICATION FILED NOV. 14, 1913.

1,118,864.

Patented Nov. 24, 1914.

J. G. & G. R. INSHAW.
APPARATUS FOR THE MANUFACTURE OF HOLLOW METAL BLOOMS OR BILLETS AND TUBES THEREFROM.
APPLICATION FILED NOV. 14, 1913.

1,118,864.

Patented Nov. 24, 1914.
4 SHEETS—SHEET 4.

WITNESSES
L. H. Grote

INVENTORS
John George Inshaw
George Richard Inshaw
BY
Johnson and Johnson
their ATTORNEYS

UNITED STATES PATENT OFFICE.

JOHN GEORGE INSHAW AND GEORGE RICHARD INSHAW, OF NEAR GARTCOSH, SCOTLAND.

APPARATUS FOR THE MANUFACTURE OF HOLLOW METAL BLOOMS OR BILLETS AND TUBES THEREFROM.

1,118,864.　　　　　Specification of Letters Patent.　　Patented Nov. 24, 1914.

Application filed November 14, 1913. Serial No. 801,012.

*To all whom it may concern:*

Be it known that we, JOHN GEORGE INSHAW and GEORGE RICHARD INSHAW, subjects of the King of Great Britain, and both residing at Lochwood House, near Gartcosh, Lanarkshire, Scotland, have invented new and useful Improvements in and Apparatus for the Manufacture of Hollow Metal Blooms or Billets and Tubes Therefrom, of which the following is a specification.

The object of our invention is to provide improved means for manufacturing hollow metal blooms, or billets, direct from puddled iron, or steel, or other metal, in such a manner as to enable tubes to be made therefrom without the necessity for reheating the metal, our said invention relating to the class of machine, or apparatus, in which the metal in a semi-molten, or sufficiently plastic condition, is placed in a receptacle and a piercing mandrel is forced through the metal in the said receptacle and then the pierced metal, while still upon the mandrel which has pierced it, is received between rolls and is acted upon thereby so as to form the required article.

According to our invention the metal from which the tubes are manufactured is placed, direct from the furnace, in a receptacle in line with conical rolls, (arranged as before proposed, with their largest diameter at the entrance end of the "pass" between them and their smaller ends adapted to form the exterior of the tube) and a piercing mandrel is forced through the said metal which is then released from the said receptacle and conveyed to the said conical rolls and rolled thereby upon the mandrel to the form of the required tube.

We will describe with reference to the accompanying drawings a machine or apparatus, constructed in accordance with our invention adapted to make tubes from which its application to the manufacture of hollow blooms, or billets, which are to be subsequently made into tubes in a separate machine, or apparatus, will be readily understood, but we do not limit ourselves to the precise details of construction hereinafter described and illustrated.

Figure 9:
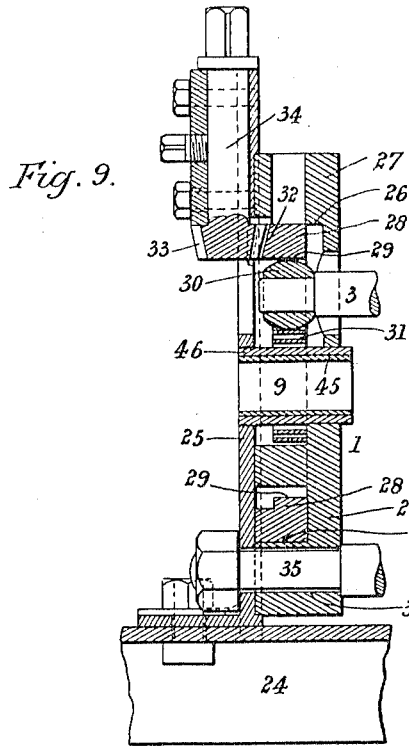
Figure 10:
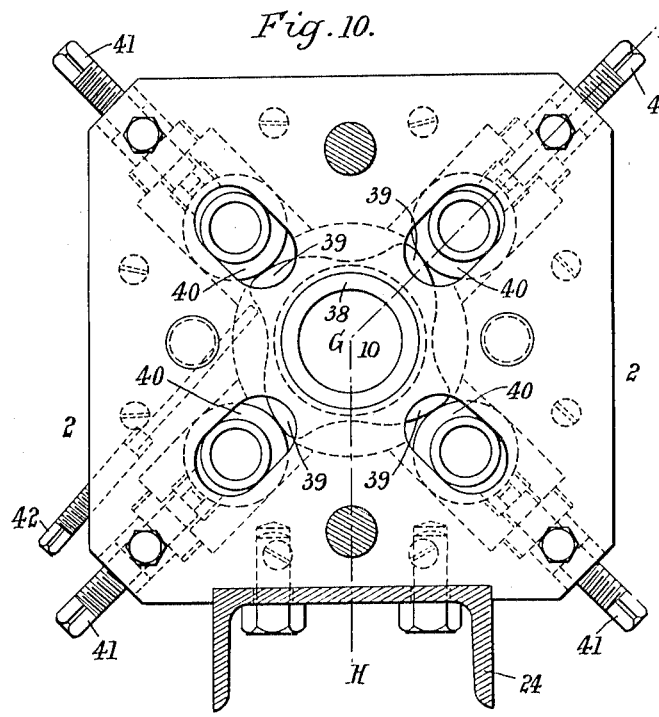
Figure 11:
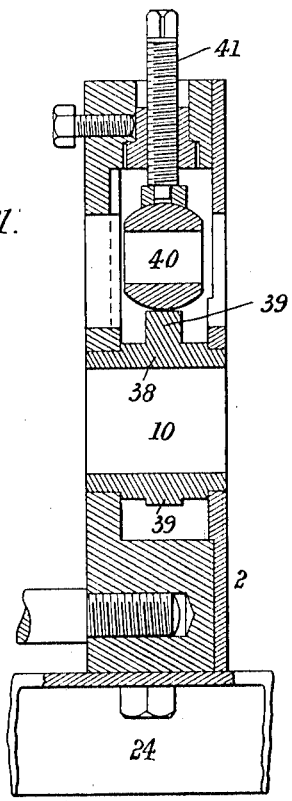

Figure 1 is a longitudinal section showing the position of the parts when the blank of metal is in the receptacle ready for piercing; Figs. 2, 3 and 4 are similar views showing different positions of the parts hereinafter referred to; Fig. 5 is an end view of Fig. 1; Fig. 6 is a transverse section on the line A, B, Fig. 1; Fig. 7 is an end view of the locking arrangement for the mandrel; Fig. 8 is an end elevation of the means of adjusting the small ends of the rolls; Fig. 9 is a section on the line C, D, E, Fig. 8; Fig. 10 is an end elevation of the means of adjusting the large ends of the rolls, and Fig. 11 is a section on the line F, G, H, Fig. 10.

In the following description when we refer to the "front part" of the machine we mean at, or toward, that end from which the produced blooms, or billets, or the tubes, leave the machine, and when we refer to the "rear part" of the machine we mean at, or toward, the other end.

Carried by a suitable bed-plate at the front part of the machine are outer and inner housings 1, 2, each provided with bearings for conical rolls 3. Adjacent to the side of the inner housing 2 farthest away from the front part of the machine is a cylindrical receptacle 4 provided with an end-piece 5 which can be removed and replaced by any suitable means. Adjacent to the cylindrical receptacle 4 is a guide, or sleeve 6, through which passes the aforesaid piercing mandrel 7, the said guide, or sleeve, being adapted to slide in a bearing 8 carried by the framing in any suitable manner. The inner and outer housings 1, 2, have central openings 9, 10 respectively, (see Figs. 8–11) provided therein, in line with the "pass" between the rolls 3, the said openings each of a diameter which will respectively allow of the passage into the rolls of the metal to be operated upon and of the tube from the said rolls.

The piercing mandrel 7 is preferably operated by hydraulic pressure admitted to a cylinder 11, carried by suitable supports, having stuffing boxes 12, 13, through which passes a ram 14, (hereinafter referred to as the operating ram) working in the said cylinder. The said operating ram extends through the rear end of the cylinder 11 and has secured thereto a cross-head 15 to which are secured smaller hydraulic rams 16, working in cylinders 17 for the purpose of returning the parts to their normal position after the tube has passed from the rolls. The mandrel 7 passes through the operating ram 14, and to its rear end is secured a rod 18, provided with a washer 19, and nut 20, which prevent the mandrel 7 being drawn too far through the rolls 3, during the rolling operation. The mandrel 7 is fed in through an opening 21, in a piece 22, secured to, or formed in one with, the operating ram 14, and the said mandrel is caused to move forward with the said ram by means of a bridge-piece 23 (see Figs. 1, 2 and 7) passed over the rod on the end of the mandrel.

Means may be provided at either, or both ends of the rolls for effecting adjustment thereof. In order to adjust the distance apart of the small ends of the rolls, the outer housing 1 is preferably constructed as follows:—Attached to the bed-plate 24 (see Figs. 8 and 9) is a rectangular plate 25, to which is movably secured a disk 27, provided with a recess 26, in which is adapted to rotate an inner disk 28, having on its inner periphery, cam surfaces 29, upon which spherical bearings 30, on the ends of the rolls 3, are caused to bear by a spring, 31. The said inner disk is provided with a rack 32, with which engages a pinion 33, on the end of a spindle 34, so that by turning the said spindle in one, or the other, direction, the small ends of the rolls can be radially adjusted nearer to, or farther from, each other as desired, and as all the cam surfaces 29 are of like contour the said small ends of the rolls are all adjusted to the same extent. In order to vary the amount of feed of the bloom, or billet, through the rolls, the small ends of the said rolls can be adjusted circumferentially with respect to the large ends by loosening bolts 35, passing through holes in the rectangular plate 25, and through slots 36, in the disk 27, and turning this disk by means of a handle, or lever, 37 (see Figs. 1-4).

The means for adjusting the large ends of the rolls is preferably as follows:—Carried by the inner housing 2, is a hollow cylindrical piece 38, (see Figs. 10 and 11) having on its outer periphery cam surfaces 39, against which spherical bearings 40, on the large ends of the rolls 3, are caused to bear by screws 41, so that by unscrewing the said screws and turning the cylindrical piece 38, by means of a screw 42, the large ends of the rolls can be moved farther from each other, while by unscrewing the screw 42, and screwing down the screws 41, the ends of the rolls can be brought radially nearer together. All the cam surfaces 39 are of like contour and consequently the large ends of the rolls are all equally adjusted.

The operation of the machine, or apparatus, is as follows:—The plastic metal 43, having been placed in the receptacle 4, the operating ram 14, is caused to move forward, and, by means of the locking-piece 23, bearing against a shoulder on the piercing mandrel 7, to force the said mandrel forward through the metal 43, see Fig. 2. The end-piece 5 on the receptacle 4 is then removed to allow the mandrel 7 and pierced metal 43, to pass through the space between the rolls 3. When the mandrel 7 has pierced the metal 43, the operating ram 14, comes in contact with the guide, or sleeve 6, and pushes it forward into the receptacle 4, and so forces the hollow bloom, or billet, 44, between the rolls 3, see Fig. 3. The mandrel 7, and operating ram 14, advance together until the said ram reaches the fixed bearing 8, whereupon the mandrel 7, and the hollow bloom, or billet, 44, thereon are drawn by the action of the rolls farther through the rolls 3, and are rotated, by the action of the said rolls on the exterior of the hollow bloom, or billet, 44, until the nose of the said mandrel takes its bearing in a movable bush 45 (see Figs. 8 and 9) in the outer housing 1, the mandrel then ceasing to advance, but continuing to rotate. Rings 47, 48, free to rotate in the housings 1, 2, respectively, are provided to relieve the bearings of a greater part of the thrust. See Figs. 1 to 4.

It will be seen on reference to Fig. 4, which shows the hollow bloom, or billet, during the process of rolling, that, in comparison to the diameter of the hollow bloom, or billet, large working surfaces of the rolls 3 and also of the mandrel 8 are provided whereby they are rendered more durable. Further it will be seen that in this arrangement the piercing mandrel is supported throughout practically its entire length and thus all tendency of the said mandrel to bend is prevented and the guide, or sleeve 6, insures that the mandrel enters the metal 43 centrally.

In machines, or apparatus, intended only for the manufacture of hollow blooms, or billets, the rolls would be reduced in length and the diameter of the "pass" at the outer ends of the said rolls would be increased to the diameter of the hollow bloom, or billet, to be produced. In this case, when the bloom, or billet, has passed the rolls the mandrel would be removed and the said bloom, or billet, be conveyed to a separate machine to form it into a tube.

The machine hereinbefore described is arranged in a horizontal position, but it is to be understood that it can be arranged in a vertical, or inclined, position, if desired.

What we claim is:—

1. Apparatus of the character described comprising a group of forming rolls having a conical bore or pass of the type described, a piercing mandrel alined with the pass between said rolls, a receptacle for receiving a charge of hot plastic metal arranged in advance of the pass and being open at one end to admit said mandrel and having an abutment at the opposite end against which said mandrel thrusts to pierce the metal in the receptacle, together with means for forcing said mandrel through the receptacle and into the pass between the rolls with the pierced metal on the mandrel so that the forming rolls may act upon the metal with the mandrel in position therein.

2. Apparatus of the character described, comprising a group of forming rolls having a conical bore or pass of the type described, a piercing mandrel alined with the pass between said rolls, a receptacle for receiving a charge of hot plastic metal arranged in advance of the pass and being open at one end to admit said mandrel and having a temporary abutment at the opposite end against which said mandrel thrusts to pierce the metal in the receptacle, together with means for forcing said mandrel through the receptacle and into the pass between the rolls with the pierced metal on the mandrel so that the forming rolls may act upon the metal with the mandrel in position therein.

3. Apparatus of the character described, comprising a group of forming rolls having a conical bore or pass of the type described, a piercing mandrel alined with the pass between said rolls, a receptacle for receiving a charge of hot plastic metal arranged in advance of the pass and being open at one end to admit said mandrel and having a removable abutment at the opposite end against which said mandrel thrusts to pierce the metal in the receptacle, together with means for forcing said mandrel through the receptacle and into the pass between the rolls with the pierced metal on the mandrel so that the forming rolls may act upon the metal with the mandrel in position therein.

4. In apparatus of the character described, a group of forming rolls having a conical bore or pass of the type described, a piercing mandrel alined with the pass between the rolls, a receptacle for receiving a charge of hot plastic metal arranged in advance of the pass and being open at one end to admit said mandrel and temporarily closed at the opposite end to afford an abutment against which the mandrel thrusts to pierce the metal on the receptacle, means for forcing said mandrel through the receptacle and into the pass between the rolls, and a plunger adapted to enter said receptacle after the mandrel and extrude the metal therefrom toward the forming rolls after said metal has been pierced by the plunger.

5. In apparatus of the character described, a receptacle for receiving a charge of hot plastic metal, a group of forming rolls with conical bore or pass arranged to receive the metal from said receptacle, a mandrel alined with said bore, a sleeve through which said mandrel passes, means for forcing in series said mandrel through the plastic metal and the sleeve into the metal receptacle to extrude the metal therefrom, with the mandrel in piercing position, into the pass between the rolls.

6. In apparatus of the character described, a receptacle for receiving a charge of hot plastic metal, a group of forming rolls with conical bore or pass arranged to receive the metal from said receptacle, a mandrel alined with said bore, a ram for forcing the mandrel through the plastic metal and conveying the latter thereon to the forming rolls, together with a lost motion connection between said ram and mandrel permitting the latter to advance under the drawing action of the forming rolls after the ram has halted.

7. In apparatus of the character described, a receptacle for receiving a charge of hot plastic metal, a group of forming rolls with conical bore or pass arranged to receive the metal from said receptacle, a mandrel alined with said bore, a ram for forcing the mandrel through the plastic metal and conveying the latter thereon to the forming rolls, together with a lost motion connection into said ram and mandrel permitting the latter to advance under the drawing action of the forming rolls after the ram has halted, together with means for halting the advance of the mandrel at predetermined position while leaving it free to rotate with the metal under the action of the forming rolls.

8. In apparatus of the character described, a pair of inner and outer housings, a group of conical forming rolls having bearings therein together with thrust rings free to rotate in said housings and against which said rolls bear, for the purpose described.

9. In apparatus of the character described, a group of forming rolls, a housing for one end thereof comprising a slotted outer disk and an inner disk supported therein, cam bearing surfaces on said inner disk, springs for pressing the roll bearings against said cam surfaces, and means for rotating said inner disk to effect the radial displacement of said roll bearings in the slots on said outer disk.

10. In apparatus of the character described, a group of forming rolls having a coned bore or pass, housings for the opposite ends of the rolls, a bearing disk for the ends of the rolls in one housing and means for rotating said disk to incline the axis of the rolls to the axial plane of the pass.

11. In apparatus of the character described, a group of forming rolls having at one end a housing for the roll bearings and comprising a central adjustable cam piece having like cam surfaces for the several rolls and against which the roll bearings rest, together with a radially adjustable securing screw for each bearing to hold it against the cam piece, substantially as described.

In testimony whereof we have signed our names to this specification in the presence of two subscribing witnesses.

JOHN GEORGE INSHAW.
GEORGE RICHARD INSHAW.

Witnesses:
WM. CLEMIE,
ANDREW LAMBIE.